Sept. 10, 1957  B. A. AUBE  2,806,133
ILLUMINATED SPIRIT LEVEL
Filed June 26, 1953  2 Sheets-Sheet 1
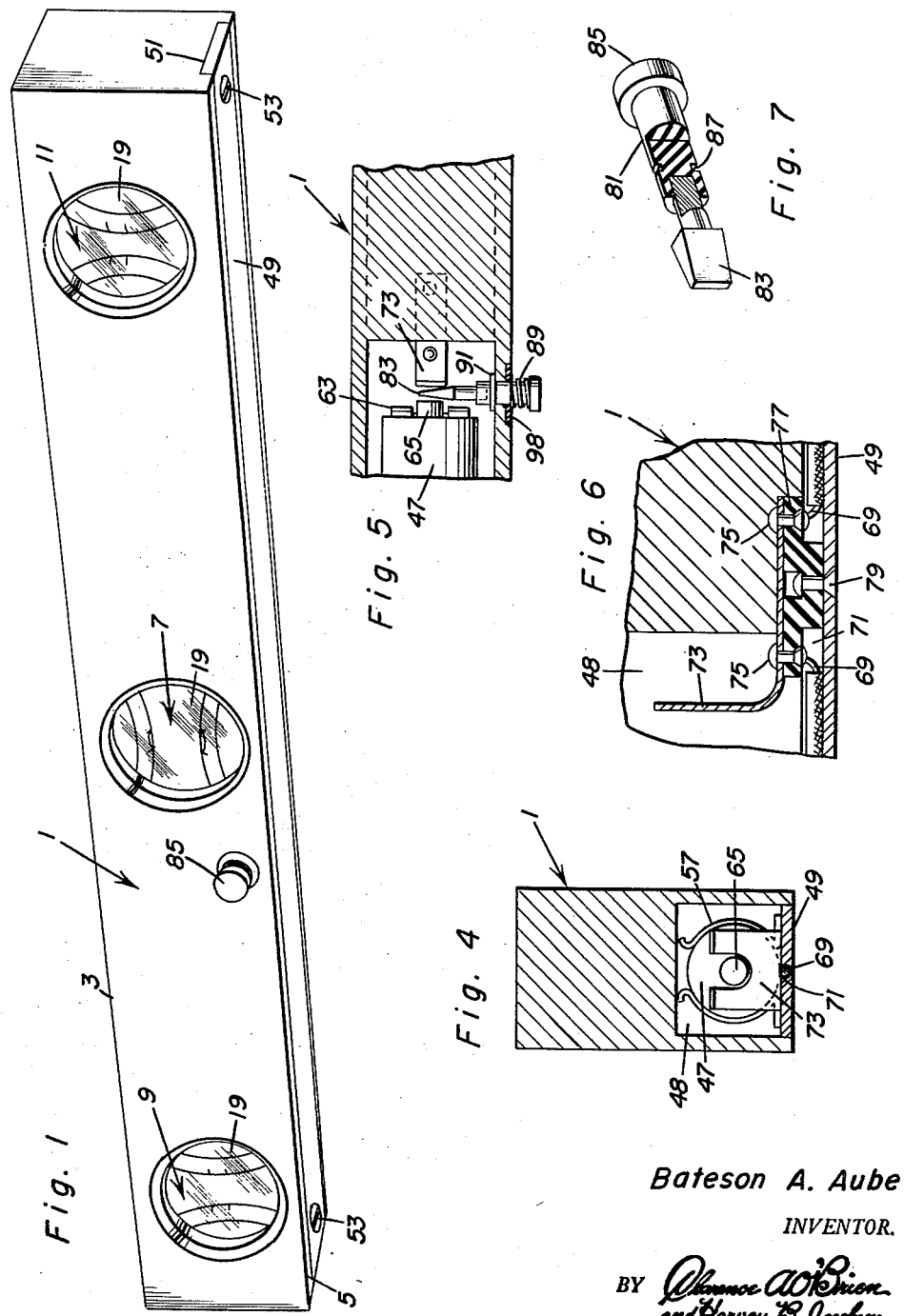
Bateson A. Aube
INVENTOR.

Sept. 10, 1957     B. A. AUBE     2,806,133
ILLUMINATED SPIRIT LEVEL
Filed June 26, 1953     2 Sheets-Sheet 2
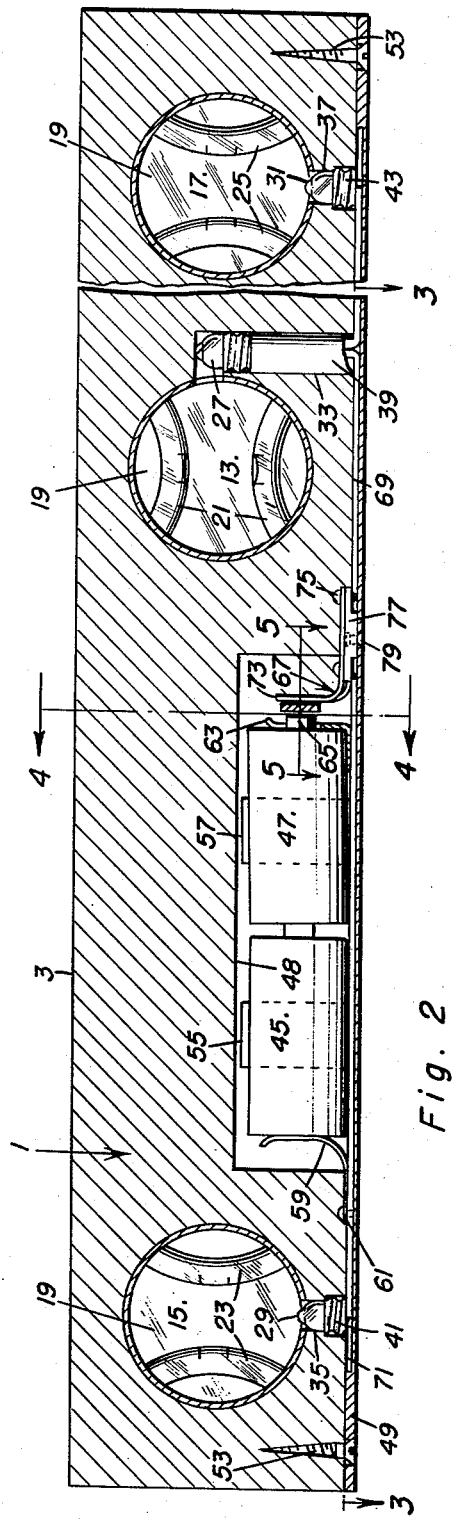
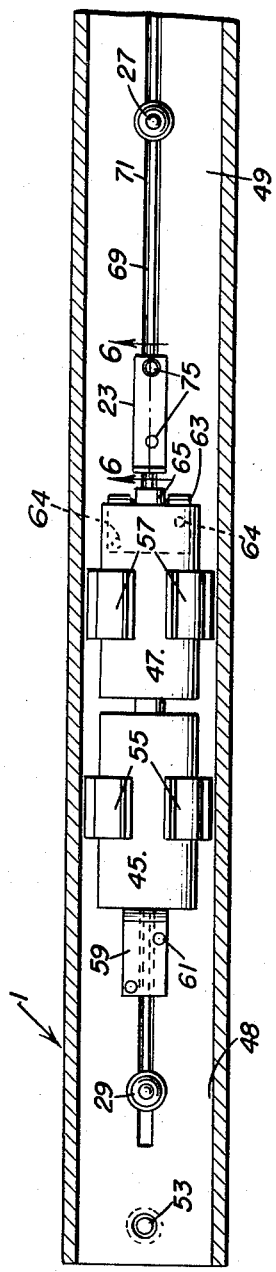
Bateson A. Aube
INVENTOR.

United States Patent Office 2,806,133
Patented Sept. 10, 1957

2,806,133
ILLUMINATED SPIRIT LEVEL

Bateson A. Aube, Detroit, Mich.

Application June 26, 1953, Serial No. 364,289

1 Claim. (Cl. 240—6.44)

My invention relates to improvements in illuminated spirit levels for carpenters, mechanics and the like.

The primary object of my invention is to equip a spirit level of the type having a solid beam and a plurality of longitudinally spaced, spirit level tube units therein, with inexpensive means for electrically illuminating all of the tube units simultaneously, at will, and which may be embodied in the specified type of level without material alteration in the beam of the level.

Another object is to provide illuminating means for all of said units attachable to and detachable from the beam as a single unit.

Other and subordinate objects, within the purview of my invention, together with the precise nature of my improvements will become readily apparent when the succeeding description and claim are read with reference to the drawings accompanying and forming part of this specification.

In said drawings:

Figure 1 is a view in perspective of a spirit level equipped with my improved illuminating means in the preferred embodiment thereof;

Figure 2 is an enlarged view in vertical longitudinal section, partly broken away;

Figure 3 is a fragmentary view in horizontal section taken on the line 3—3 of Figure 2;

Figure 4 is a view in transverse section taken on the line 4—4 of Figure 2;

Figure 5 is a fragmentary view in horizontal section taken on the line 5—5 of Figure 2;

Figure 6 is an enlarged fragmentary view in vertical longitudinal section taken on the line 6—6 of Figure 3, and Figure 7 is an enlarged view in perspective of the switch plunger, partly in section.

Referring to the drawings by numerals, 1 designates the usual flat beam of the type of level with which my improvements are especially concerned, and which is provided with longitudinal straightedges 3, 5, and with a central spirit level tube unit 7 and end spirit level tube units 9, 11. The beam 1 is formed of wood or other dielectric material. The spirit level tube units 7, 9, 11 include transverse, cylindrical central and end chambers 13, 15, 17 in the beam 1 closed by end sight glasses 19, the central chamber 13 having therein a pair of horizontal spirit level tubes 21, and the end chambers 15, 17 having therein pairs of vertical spirit level tubes 23, 25, the tubes in each instance being laterally spaced in each pair.

According to my improvements, illuminating means for the spirit level tube units 7, 9, 11 is provided comprising electric light bulbs 27, 29, 31 for the chambers 13, 15, 17, respectively, inserted in bores 33, 35, 37 extending into the beam 1 from the straightedge 5 and opening into said chambers 13, 15, 17 respectively. The electric light bulbs 27, 29, 31 are of the flashlight type with the conventional sockets 39, 41, 43 fitted in said bores 33, 35, 37 for removal therefrom and extending to the outer ends of said bores.

A pair of dry cells 45, 47, forming a battery, are opposed end to end in the usual manner in a longitudinal recess, or chamber 48 in the straightedge 5 between the center chamber 13 and one end chamber 15.

The sockets 39, 41, 43 and the dry cells 45, 47 are supported by a metal circuit grounding bar 49 common thereto and to which the sockets are attached by welding, not shown, for grounding the electric light bulbs 27, 29, 31 to said bar. The dry cells 45, 47 are removably mounted on said bar 49 by means presently described. The grounding bar 49 extends longitudinally along the straightedge 5 in which it is countersunk flush therewith in a longitudinal groove 51 in said edge 5 and secured in said groove by screws 53 in the ends of said bar 49.

The mounting means for the dry cells 45, 47 comprises pairs of resilient clips 55, 57 on said bar 49 straddling said cells 45, 47 intermediate the ends of the cells, a right angled resilient grounding clip 59 engaging the negative pole end of the dry cell 45 and riveted to the bar 49, as at 61, and a bifurcated resilient clip 63 engaging the positive pole end of the dry cell 47 and clearing the positive pole terminal 65 of said dry cell 47, said clip 63 being riveted to said bar 49 at 64.

The electric light bulbs 27, 29, 31 are connected in parallel in circuit with the battery the circuit being completed at the grounding bar 49 and under control of a plunger type switch 67, as follows. An insulated lead line 69 extends along and is countersunk below the clips 59, 63 in a longitudinal groove 71 in the inner side of said bar 49 and is suitably connected to one side of the electric light bulbs 27, 29, 31 the other sides of which are grounded at the grounding bar 49.

The switch 67 comprises a right angled switch contact 73 interposed in said line 69 opposite and spaced from the positive terminal 65 of the dry cell 47 and is riveted, as at 75, to an insulation block 77 riveted, as at 79, to said bar 49, said contact 73 extending into the recess or chamber 48, the arrangement being such that said terminal 65 and the contact 73 form a pair of switch contacts. The rivets 75 connect the contact 73 to the line 69.

A switch closing plunger 81 is slidably mounted in the beam 1 to extend out of one side thereof for advance to interpose a wedge-shaped, conductive, inner end 83 between the terminal 65 and contact 73 to bridge the same and close the switch 67. The plunger 81 is advanced into the recess 48 through said side of the beam 1. The plunger 81 with the exception of said end 83 is of nonconductive material and provided with an outer end head 85 and an intermediate circumferential groove 87. A coil spring 89 on the plunger 81 between the beam and said head 85 normally retracts said plunger to normally open the switch 67. A snap ring 91 in the groove 87 abuts an inner side of the recess 48 and limits retraction of said plunger. A washer 98 on the plunger 81 countersunk in the outer side of the beam 1 backs the spring 89.

The operation of my improved level will be readily understood. With the switch plunger 81 advanced, to close the switch 67, current flows over the line 69 to one side of the electric light bulbs 27, 29, 31 and a circuit is completed by grounding of said bulbs on their other sides through the sockets 39, 41, 43 to the grounding bar 49, and by grounding of the described battery to said bar. Thus the electric light bulbs are simultaneously energized to simultaneously illuminate the chambers 13, 15, 17 so that the spirit level tubes in said chambers are readily visible through the sight glasses 19, in dark corners, under stairways, in basements, tunnels, and the like.

As will be seen, by removing the screws 53, the grounding bar 49 may be detached from the beam 1 to detach, as a unit therewith, the electric light bulbs 27, 29, 31, the dry cells 45, 47, the mounting means for said cells and the switch contact 73. Obviously, the same parts may be attached by attaching said bar and as a unit with the bar. The only alteration required in the beam 1 is forming the bores 33, 35, 37, the groove 51 and the recess 48 which may be easily and quickly accomplished in a wooden beam. The dry cells 45, 47 may be removed from their mounting means easily and quickly, in a manner which will be obvious, for replacement purposes.

The foregoing will, it is believed, suffice to impart a clear understanding of my invention, without further explanation.

Manifestly the invention, as described, is susceptible of modification without departing from the inventive concept, and right is herein reserved to such modifications as fall within the scope of the appended claim.

What is claimed as new is as follows:

A spirit level comprising a beam having a longitudinal straightedge, and a plurality of longitudinally spaced chambers extending transversely therethrough and provided with spirit level tube units therein, bores extending from said straightedge to said chambers and opening into said chambers and at corresponding ends thereof onto said straightedge, a longitudinal chamber in said beam opening onto said straightedge, and means for illuminating said longitudinally spaced chambers simultaneously comprising a bar detachably attached to and extending along said straightedge and closing said longitudinal chamber and said corresponding ends of said bores, electric light bulbs in said bores grounded on one side to said bar and attached thereto for detachment therewith, a battery in said longitudinal chamber, a pair of resilient clips on said bar extending into said longitudinal chamber and retaining said battery on said bar for detachment therewith and one of said clips grounding one pole of the battery to said bar, a terminal member on said bar for detachment therewith insulated therefrom and extending into said longitudinal chamber opposite the other pole of said battery and forming with said other pole a pair of switch contacts, an insulated conductor line between said bar and straightedge connecting the other sides of said light bulbs to said terminal member, and a switch plunger in said beam movable into bridging relation to said other pole and said terminal member to close a circuit from said battery to said light bulbs grounded through said bar.

References Cited in the file of this patent

UNITED STATES PATENTS

| | | |
|---|---|---|
| 648,432 | Prentiss | May 1, 1900 |
| 1,001,206 | McCullough | Aug. 22, 1911 |
| 1,542,512 | Lett | June 16, 1925 |
| 1,583,489 | Perrine | May 4, 1926 |
| 1,915,596 | Dyer | June 27, 1933 |
| 2,198,945 | Morris | Apr. 30, 1940 |
| 2,481,736 | Foerster | Sept. 13, 1949 |